United States Patent
Jordache et al.

[11] Patent Number: 6,084,846
[45] Date of Patent: Jul. 4, 2000

[54] LIQUID IMMERSION LENS FOR OPTICAL DATA STORAGE

[75] Inventors: Nicholas Jordache, Eden Prairie; Ronald E. Gerber, Richfield; Edward C. Gage, Apple Valley; Lori G. Swanson, Bloomington; Christina L. Hutchinson, Eden Prairie, all of Minn.

[73] Assignee: Seagate Technology, Inc., Scotts Valley, Calif.

[21] Appl. No.: 09/089,528

[22] Filed: Jun. 3, 1998

Related U.S. Application Data

[60] Provisional application No. 60/078,841, Mar. 20, 1998.

[51] Int. Cl.⁷ .................................................. G11B 7/00
[52] U.S. Cl. ........................................ 369/112; 369/44.11
[58] Field of Search ................... 369/43, 44.11, 369/44.14, 44.15, 44.16, 44.22, 112

[56] References Cited

U.S. PATENT DOCUMENTS

| | | | |
|---|---|---|---|
| 3,980,811 | 9/1976 | Schaefer et al. | 178/6.6 R |
| 4,229,067 | 10/1980 | Love | 350/96.15 |
| 4,310,916 | 1/1982 | Dil | 369/109 |
| 4,443,700 | 4/1984 | Macedo et al. | 250/227 |
| 4,569,038 | 2/1986 | Nagashima et al. | 369/44 |
| 4,581,529 | 4/1986 | Gordon | 250/227 |
| 4,706,235 | 11/1987 | Melbye | 369/46 |
| 4,769,800 | 9/1988 | Moser et al. | 369/32 |
| 4,815,064 | 3/1989 | Melbye | 369/59 |
| 4,933,537 | 6/1990 | Takahashi et al. | 235/454 |
| 4,994,658 | 2/1991 | Takahashi et al. | 235/473 |
| 5,004,307 | 4/1991 | Kino et al. | 350/1.2 |
| 5,096,277 | 3/1992 | Kleinerman | 385/12 |
| 5,125,750 | 6/1992 | Corle et al. | 359/819 |
| 5,138,676 | 8/1992 | Stowe et al. | 385/32 |
| 5,153,870 | 10/1992 | Lee et al. | 369/111 |
| 5,193,132 | 3/1993 | Uken et al. | 385/32 |
| 5,212,379 | 5/1993 | Nafarrate et al. | 250/227.14 |
| 5,278,812 | 1/1994 | Adar et al. | 369/44.12 |
| 5,286,971 | 2/1994 | Betzig et al. | 250/227.26 |
| 5,363,463 | 11/1994 | Kleinerman | 385/123 |
| 5,450,203 | 9/1995 | Penkethman | 356/373 |
| 5,493,393 | 2/1996 | Beranek et al. | 356/328 |
| 5,497,359 | 3/1996 | Mamin et al. | 369/44.15 |
| 5,535,189 | 7/1996 | Alon et al. | 369/102 |
| 5,537,385 | 7/1996 | Alon et al. | 369/119 |
| 5,566,159 | 10/1996 | Shapira | 369/99 |
| 5,574,712 | 11/1996 | Alon et al. | 369/102 |
| 5,592,444 | 1/1997 | Alon et al. | 369/13 |
| 5,598,393 | 1/1997 | Alon et al. | 369/102 |

*Primary Examiner*—Paul W. Huber
*Attorney, Agent, or Firm*—Westman, Champlin & Kelly, P.A.; Peter S. Dardi

[57] ABSTRACT

A slider for an optical read head includes a liquid-immersion-lens between an objective lens and an optically transparent base of the slider. The liquid-immersion-lens includes a high index of refraction liquid, thereby eliminating a lens-air interface at the lower surface of the objective lens. The liquid-immersion-lens provides for the production of a small light spot at the surface of the optical disc.

18 Claims, 1 Drawing Sheet

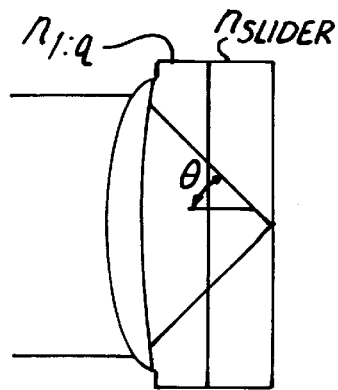
Fig. 1
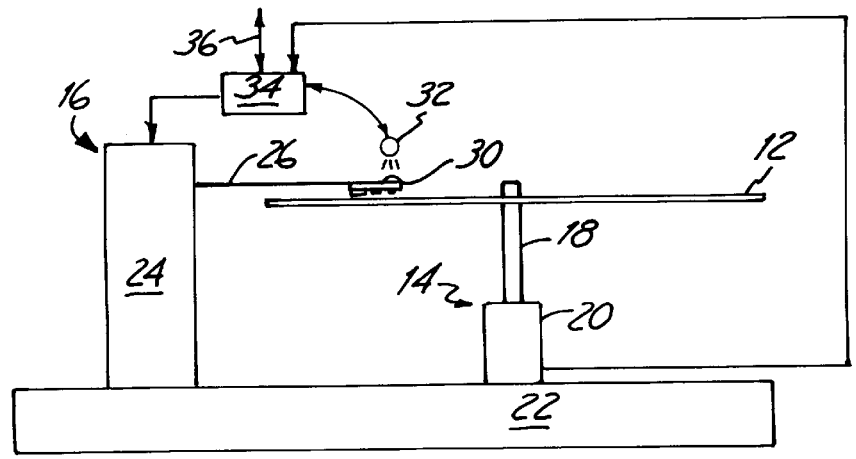
Fig. 2
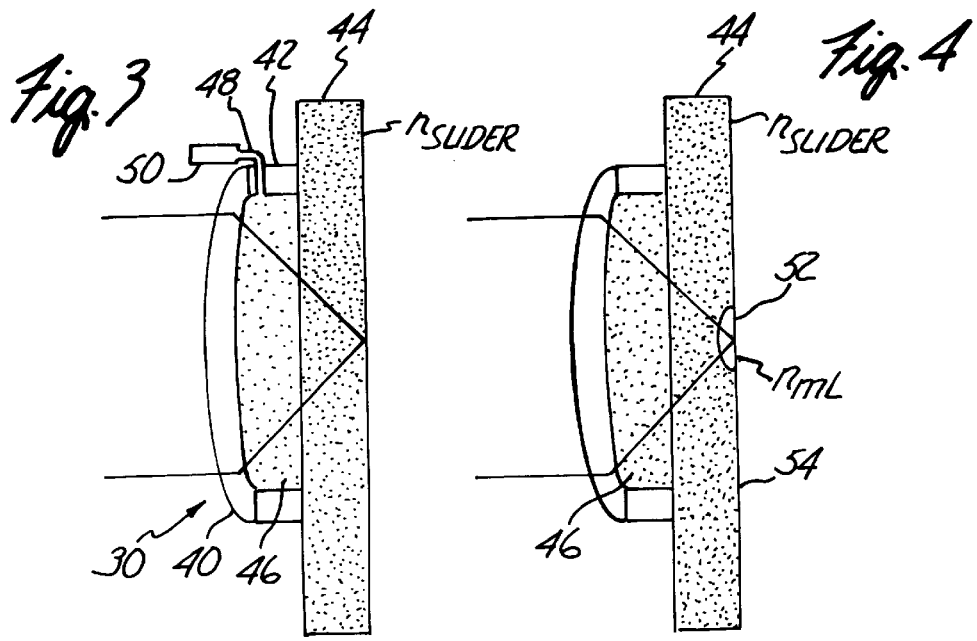
Fig. 3
Fig. 4

LIQUID IMMERSION LENS FOR OPTICAL DATA STORAGE

CROSS REFERENCE TO RELATED APPLICATIONS

This application claims priority to provisional application serial No. 60/078,841, filed on Mar. 20, 1998.

BACKGROUND OF THE INVENTION

The invention relates to sliders for near-field optical data storage. More particularly, the invention relates to optical components mounted on a slider suitable for a near-field optical data storage and retrieval.

Optical data storage disc systems are useful for storing large quantities of data. The data is accessed by focusing a light beam, generally a laser beam, onto a data surface of a disc and detecting light reflected from or transmitted through the data surface. In general, in optical data storage systems, data is in the form of physical or magnetic marks carried on the surface of the disc. The physical or magnetic marks are detected using the reflected laser light.

There are a number of different optical disc technologies that are known in the industry. For example, compact discs currently are used to store digital data computer programs or digitized music. Typically, compact discs are permanently recorded during manufacture. Another type of optical system involves a write-once-read-many (WORM) system in which a user can write information permanently onto a disc. In addition, phase change and magneto-optic (M-O) systems provide erasable optical disc systems, which are clearly desirable for certain applications. Phase change systems detect data by sensing a change in reflectivity. M-O systems read data by measuring the rotation of the incident light polarization due to the storage medium.

High density optical storage can make use of near-field optical techniques. Near-field optical recording makes use of optical coupling between optical components on the slider with the surface of the optical disc. This optical coupling involves both evanescent fields near the surface of the slider and fields that propagate in air to focus objects very close to the slider. Generally, M-O and phase change systems use near-field optical techniques.

Near-field optical recording can be accomplished by focusing the beam through a pinhole that is smaller than the diffraction limited spot size. Alternatively, the beam can be focused through a Solid-Immersion-Lens (SIL). As described in U.S. Pat. No. 5,125,750 to Corle et al., the SIL is a spherical optical component, having a surface coinciding with a portion of a sphere, that is located with the center of the sphere approximately at the focal point of an objective lens.

SUMMARY OF THE INVENTION

The invention features a slider for use in an optical disc, data storage apparatus. The slider has an objective lens mounted above a base, a lens support forming a liquid compartment between the objective lens and a lower surface and liquid effectively filling the liquid compartment. The optical disc data storage system includes an actuator arm having a distal end and a transducing element including an optical source. The optical source projects light toward the optical elements of the slider, which is mounted at or near the distal end of the actuator arm.

BRIEF DESCRIPTION OF THE DRAWINGS

FIG. 1 is a schematic illustration of the effect of a liquid immersion lens having an index of refraction approximately the same as the index of refraction of the slider base.

FIG. 2 is a schematic side view of an optical recording system along with an optical disc.

FIG. 3 is a sectional side view of a slider for the optical recording system in FIG. 2, with the cross section taken through the center of the objective lens.

FIG. 4 is a sectional side view of a slider having a microlens insert, with the cross section taken through the center of the objective lens.

DETAILED DESCRIPTION OF THE PREFERRED EMBODIMENTS

Near-field optical reading heads fly close enough to the disc surface such that the bottom of the slider is optically coupled to the disc surface through coupling to evanescent fields and to fields that propagate in air that focus objects close to the slider. A liquid-immersion-lens is found to effectively replace a Solid-Immersion-Lens (SIL) to optically couple an objective lens to the bottom of the slider without introducing a focusing limit due to Rayleigh diffraction at an air interface. Because the areal density of the disc varies inversely as the spot size squared, it is desirable to focus the beam to the smallest possible spot. The liquid-immersion-lens is formed by a volume of high index of refraction liquid located between an objective lens and an optically transparent base substrate. With the liquid-immersion-lens only one solid lens is needed on the slider, i.e., the objective lens.

A range of relatively high index of refraction liquids or gels can be used to form the liquid-immersion-lens. Reference to liquids implicitly includes gels and the like, throughout. Suitable liquids can have an index of refraction approximately matched to the index of refraction of the base substrate of the slider body. For these matched liquids, the optical quality of the top surface of the slider body becomes unimportant. Performance generally is improved by minimizing the number of optical surfaces and interfaces in the system. If desired, a mixture of two or more immiscible liquids can be used such that the liquid-immersion-lens includes layers of high index of refraction liquids. Suitable liquids are available from R. P. Cargille Laboratories, such as refractive index series H, EH, FH and GH with refractive indices between 1.81 and 2.31, meltmount adhesives with refractive indices between 1.66 and 1.70, and immersion liquids with refractive indices between 1.63 and 1.7. FIG. 1 displays the focusing features of the slider when $n_{LIQ}$ is approximately the same as $n_{SLIDER}$.

Note that the focal point of the objective lens is altered by the elimination of the objective lens/air interface. For example, if the index of refraction of the liquid is approximately matched to the index of refraction of the objective lens, the diffraction by the objective lens takes place only at the top surface of the lens at the lens/air interface. The altered performance of the lens can be taken into account in the selection of the objective lens. Accordingly, the objective lens generally is selected to yield the same focal point as selected with a SIL. In particular, the focal point is selected to be approximately the bottom of the slider or, equivalently, the top surface of the disc.

As a point of comparison, if there is an air gap between the objective lens and the slider body, the minimum full-width-at-half-maximum (FWHM) spot size with uniform, monochromatic illumination of the pupil of the objective lens is given by:

$$FWHM \cong \frac{1}{2}\frac{\lambda}{\sin\theta} \qquad \text{Eq. 1}$$

where lambda is the vacuum wavelength of the laser source and theta is the angle made by the cone of light leaving the objective lens. The minimum spot size is independent of the refractive index of the slider body. With standard disc geometry, the spot size also is unaffected by the refractive index of the disc. More generally, if the materials between the objective lens and the focused spot are optically homogeneous along planes perpendicular to the optical axis, then Snell's Law applies, and the focused spot size is given by Equation 1. When Equation 1 applies, the spot size is determined by the wavelength of the laser and the maximum half-angle theta at which light emerges from the objective lens.

The spot size can be reduced by placing in the path of the focused light a spherical surface centered approximately at the focal point of the objective lens. With a spherical Solid-Immersion-Lens (SIL), the light rays are perpendicular to the spherical interface at every point and, therefore, are transmitted without refraction. Also for comparison, the FWHM spot size with a correctly positioned SIL is approximately given by:

$$FWHM \cong \frac{1}{2}\frac{\lambda}{n_{SIL}\sin\theta} \qquad \text{Eq. 2}$$

Thus, the spot size is a factor of $n_{SIL}$ smaller than the spot size obtained with an air interface.

In contrast, the use of a liquid-immersion-lens reduces spot size by increasing the index of refraction of the material in contact with the second surface of the objective lens. In this way, the light is never focused in air. The FWHM spot size with a liquid-immersion-lens is given by:

$$FWHM \cong \begin{cases} \frac{1}{2}\frac{\lambda}{n_{LIQ}\sin\theta}, & \sin\theta < \frac{n_{SLIDER}}{N_{LIQ}} \\ \frac{1}{2}\frac{\lambda}{n_{SLIDER}}, & \sin\theta > \frac{n_{SLIDER}}{n_{LIQ}} \end{cases} \qquad \text{Equation 3}$$

where $n_{slider}$ is the refractive index of the slider body and $n_{liq}$ is the index of refraction of the liquid. The use of a liquid-immersion-lens eliminates the difficulty associated with alignment of a SIL such that its center is located approximately at the focal point of the objective lens.

FIG. 2 is a schematic illustration of an optical recording system 10. Optical recording system 10 is used with an optical disc 12. Optical disc 12 has a data surface that can carry optically encoded information. Optical recording system 10 includes a disc spinning system 14 and head positioning assembly 16.

Disc spinning system 14 includes a spindle 18, which is driven by spindle motor 20. Spindle motor 20 is mounted on base 22. Head positioning assembly 16 includes actuator 24, support arm 26 and head/gimbal assembly 28. Actuator 24 generally is mounted on base 22. Support arm 26 is coupled to actuator 24, which can position arm 26 along a radial direction defined by a fixed axis. Actuator 24 can be a linear or rotary actuator. Head/gimbal assembly 28 is coupled to the distal end of support arm 26. Head/gimbal assembly 28 includes slider 30 and also can include a gimbal, load beam and the like.

Optical recording system 10 also includes an optical source/sensor apparatus 32 and controller 34. Controller 34 can be coupled to optical source/sensor apparatus 32, actuator 24, spindle motor 20 and data bus 36. Controller 34 is used for controlling operation of optical recording system 10.

Slider 30 includes an objective lens 40, as shown in FIG. 3. Objective lens 40 can be mounted on lens support 42. Lens support 42 is attached to slider base 44 with generally planar surfaces. Lens support 42 can include a focus motor to make minor adjustments to the lens position. Objective lens 40, lens support 42 and slider base 44 form a cavity that holds liquid 46 having a high index of refraction. The lower portion of the cavity may not be level with the top surface of slider base 44. In other words, the liquid-immersion-lens can extend into slider base 44, if desired. The bottom surface of slider base 44 generally forms at least a portion of an air bearing surface.

Capillary tubes 48 can be used to supply additional liquid or to remove excess liquid in response to adjustments by the focus motor and to environmental changes, such as temperature and pressure. The capillary tubes can be connected with a small reservoir 50 located on slider 30 above liquid-immersion-lens 46. Similarly, the upper portion of the liquid cavity can have a volume above and at the side of objective lens 40 to serve as a reservoir.

Liquid-immersion-lens 46 can be used in conjunction with multiple surfaces, as shown in FIG. 4. In FIG. 4, slider base 44 includes a microlens 52 along lower surface 54 of slider base 44. Microlens 52 has an index of refraction $n_{ML}$ and is appropriately aligned with objective lens 40. Assuming approximately normal incidence at the interface between the slider base 44 and microlens insert 52, the spot size is reduced further by approximately the ratio $n_{SLIDER}/n_{ML}$, where $n_{ML}$ is the index of refraction of the microlens.

The embodiments described above are intended to be representative and not limiting. Although the present invention has been described with reference to preferred embodiments, workers skilled in the art will recognize that changes can be made in form and detail without departing from the spirit and scope of the invention. As used herein, "light" or "optical" refers to radiation of any wavelength and are not limited to visible radiation.

What is claimed is:

1. A slider for use in an optical recording apparatus, the slider comprising a base comprised of optically transparent material, an objective lens mounted above the top surface of the base, a lens support forming a liquid compartment between the objective lens and the top surface of the base and liquid effectively confined in the liquid compartment.

2. A slider of claim 1 wherein the objective lens has a focal point near the bottom surface of the base.

3. An optical disc data storage system comprising:

a means for flying above the surface of a spinning optical disc, the flying means having a liquid-immersion-lens; and a means for detecting light transmitted through the liquid-immersion-lens.

4. An optical disc data storage system comprising:

an actuator arm having a distal end;

a transducing element including an optical source; and a slider coupled to the distal end of the actuator arm, an objective lens mounted on a base, a lens support forming a liquid compartment between the objective lens and the base and further includes liquid effectively contained in the liquid compartment.

5. The optical disc data storage system of claim 4 wherein the optical source includes a laser.

6. The optical disc data storage system of claim 4 wherein the objective lens has a focal point approximately at the bottom surface of the base.

7. The optical disc data storage system of claim 4 wherein the lens support includes a focus motor.

8. The optical disc data storage system of claim 4 wherein the liquid is a gel.

9. The optical disc data storage system of claim 4 wherein the liquid has an index of refraction approximately equal to the index of refraction of the base.

10. The optical disc data storage system of claim 4 wherein the liquid has an index of refraction greater than the index of refraction of the base.

11. The optical disc data storage system of claim 4 wherein the slider includes capillaries in fluid communication with the liquid compartment.

12. The optical disc data storage system of claim 4 wherein the base has a lower surface that is an air bearing surface.

13. The optical disc data storage system of claim 4 wherein the base includes a microlens.

14. A method of projecting a small spot of light onto an optical disc, the method comprising projecting a light beam through optical elements of a slider flying a very small distance above a spinning disc, the optical elements of the slider comprising a base comprised of optically transparent material, an objective lens mounted above the top surface of the base, a lens support forming a liquid compartment between the objective lens and the top surface of the base and liquid effectively confined in the liquid compartment.

15. The method of claim 14 wherein the light beam is generated by a laser.

16. The method of claim 14 wherein the base of the slider is optically coupled to the surface of the disc.

17. The method of claim 14 wherein the objective lens is focused approximately onto the bottom surface of the base.

18. The method of claim 14 wherein the lens support comprises a focus motor and the method further comprises using the focus motor to adjust the distance from the objective lens to the bottom of the base to focus the light from the objective lens approximately at the bottom of the base.

* * * * *